US009552392B2

(12) United States Patent
Ghazal

(10) Patent No.: US 9,552,392 B2
(45) Date of Patent: Jan. 24, 2017

(54) OPTIMIZING NESTED DATABASE QUERIES THAT INCLUDE WINDOWING OPERATIONS

(75) Inventor: Ahmad Ghazal, Redondo Beach, CA (US)

(73) Assignee: Teradata US, Inc., Dayton, OH (US)

(*) Notice: Subject to any disclaimer, the term of this patent is extended or adjusted under 35 U.S.C. 154(b) by 0 days.

(21) Appl. No.: 13/340,665

(22) Filed: Dec. 29, 2011

(65) Prior Publication Data
US 2013/0173590 A1 Jul. 4, 2013

(51) Int. Cl.
*G06F 17/30* (2006.01)
*G06F 15/16* (2006.01)

(52) U.S. Cl.
CPC ............... *G06F 17/30483* (2013.01)

(58) Field of Classification Search
USPC .................................. 707/714, 713
See application file for complete search history.

(56) References Cited

U.S. PATENT DOCUMENTS 5,557,791 A * 9/1996 Cheng et al.

OTHER PUBLICATIONS

Teradata SQL Reference Data Manipulation Statements; Released Jan. 2005; pp. 1-374.*
Ambuj Shatdal, Order Based Analysis Functions in NCR Teradata Parallel RDBMS; Published in 2000; pp. 1-5.*
Bytes IT Community, Left Outer Join with subqueries?—dated May 14, 2007; pp. 1-4.*
Fabiano Amorim, Window Functions in SQL Server: Part 2—The Frame, Nov. 24, 2011; pp. 1-13.*

* cited by examiner

*Primary Examiner* — Alex Gofman
(74) *Attorney, Agent, or Firm* — Ramin Mahboubian

(57) ABSTRACT

A nested database query can be optimized by effectively representing a filtering function or operation (e.g., SQL filtering operation) of its outer sub-query by a qualification or qualify operation (e.g., SQL qualification operation) associated with at least one windowing function of at least one of its inner sub-queries. It will be appreciated that this representation can yield a modified query that would be equivalent (e.g., semantically equivalent) to the original nested query as its execution can produce the same results when optimization rules are applied.

15 Claims, 8 Drawing Sheets

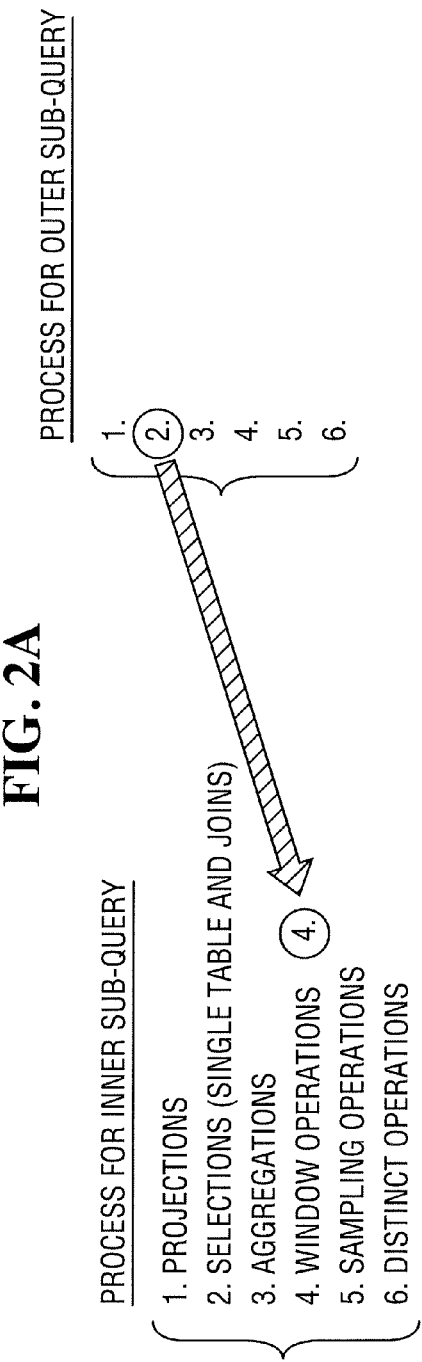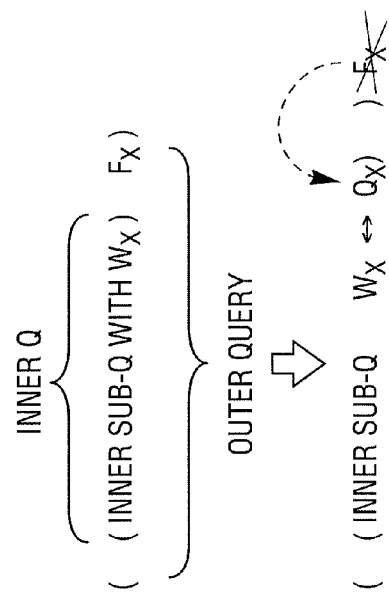

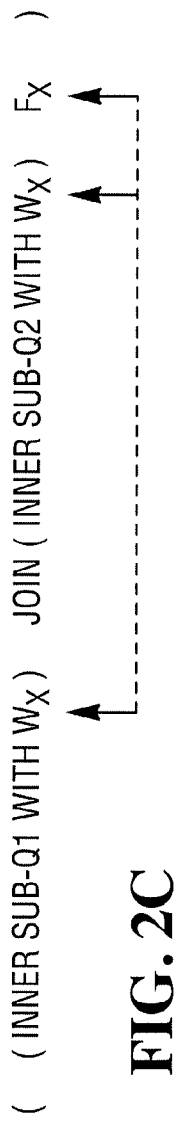

OPTIMIZING NESTED DATABASE QUERIES THAT INCLUDE WINDOWING OPERATIONS

BACKGROUND

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important objective of databases and in particular DBMS is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

In view of the prevalence of databases in various aspects life today and importance of optimization of database operations, it is apparent that techniques relating to optimization of databases would be very useful.

SUMMARY

Broadly speaking, the invention relates to computing systems and computing environments. More particularly, the invention relates to techniques for optimization techniques for optimizing nested database queries (or queries hereinafter) that include one or more window functions (e.g., SQL window or windowing functions).

In accordance with one aspect of the invention, a nested database query can be optimized by effectively representing a filtering function or operation (e.g., SQL filtering operation) of its outer sub-query by a qualification or qualify operation (e.g., SQL qualification operation) associated with at least one windowing function of at least one of its inner sub-queries. It will be appreciated that this representation can yield a modified query that would be equivalent (e.g., semantically equivalent) to the original nested query as its execution can produce the same results when optimization rules provided in accordance with another aspect of the invention are applied.

It will be appreciated that the determination of whether to optimize a nested query can be made based on optimization rules provided in accordance with another aspect of the invention. The optimization rules can, for example, be based on presence of a sampling (or sample) operation in the inner sub-query, presence and type of various Join operations (e.g., inner or outer join operations) in the nested query, presence of various clauses (e.g., WHERE or ON clauses) which an outer join operation can be predicted upon, and so on.

The invention can be implemented in numerous ways, including, for example, a method, an apparatus, a computer readable medium, a database system, and a computing system (e.g., a computing device). A computer readable medium can, for example, include at least executable code stored in a tangible or non-transient form.

For example, in one embodiment, a computing system can be operable to determining whether to represent one or more filtering operations of at least one outer sub-query of a nested query as one or more corresponding qualification operations associated with the one or more window functions in at least one inner sub-query of the nested query. In accordance with another embodiment, a computing system can also be operable to represent the filtering operation(s) of at least one outer sub-query of the nested query as one or more corresponding qualification operations associated with the window function(s) in at least one inner sub-query of the nested query.

Other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2A depicts six (6) stages that can occur in order when processing a query in various embodiments of the invention.

FIGS. 2B and 2C depicts optimization of queries in accordance with embodiments of the invention.

FIG. 2D depicts a summary of optimization rules in accordance with various embodiments of the invention.

DETAILED DESCRIPTION

Figure 1:
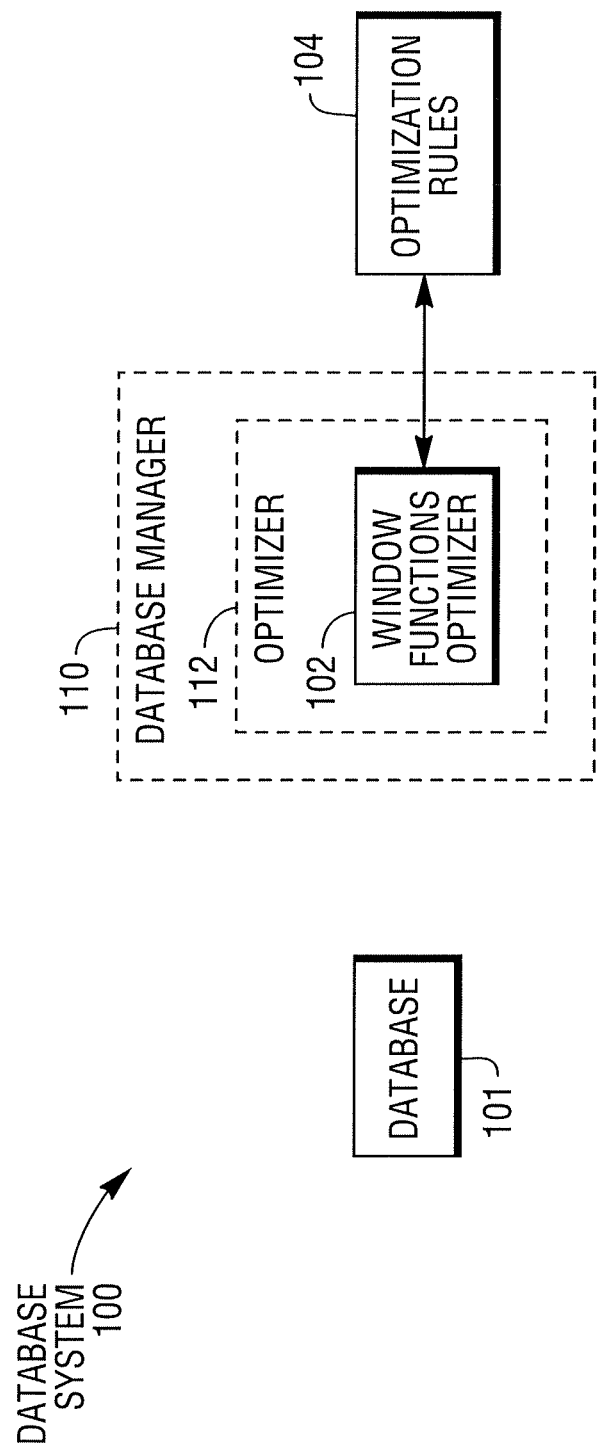
FIG. 1 depicts a database system that includes a Window Function Optimizer (WFO) in accordance with one embodiment of the invention.

As noted in the background section, databases have become prevalent in virtually all aspects of business and commerce. Moreover, database use is likely to grow even more rapidly and widely across all aspects of life. Generally, databases and management systems that manage them can be very large and extremely complex, partly in order to support an ever increasing need to store data and analyze data. Typically, larger databases are used by larger organizations. Larger databases are supported by a relatively large amount of capacity, including computing capacity (e.g., processor, memory, Input and Output (I/O) capabilities) to allow them to perform many tasks and/or complex tasks effectively at the same time (or in parallel). On the other hand, smaller databases systems are also available today and can, for example, be used by smaller organizations. In contrast to larger databases, smaller databases can operate with less capacity. In either case, however, techniques for optimization of database queries would very useful.

In particular, techniques for optimizations of nested database queries that include window functions and filtering operations are needed.

As generally known in the art, windowing functions (e.g., SQL window functions) are generally prevalent on database queries, especially in tool-generated and user-specified applications. It is also common to encapsulate such constructs in derived tables, views or sub queries. For example, tool-generated and user-specified applications may execute a SQL on such constructs with filters in the referencing block.

To further elaborate, consider a very simple example depicted as Q1 in Table 1 below where a first row is selected from a drive table "dt" with the lowest value of in column a1.

TABLE 1

Q1: SELECT a1 FROM (SELECT a1, row_number( ) OVER (ORDER BY a1) as RR FROM t1) dt
    WHERE RR =1;

Those skilled in the art will appreciated that it is semantically correct to apply the "WHERE" clause condition in the main query as a qualify condition in "dt" as shown in Q1' in Table 2 below. It is also useful to apply it within "dt" since "RR" is not needed in the projection. Furthermore, the "STAT" step (used to process window functions) can apply the predicate while processing the row_number.

TABLE 2

Q1': SELECT a1 FROM (SELECT a1, row_number( ) OVER (ORDER BY a1) as RR FROM t1
    QUALIFY RR = 1) DT As the simple example above demonstrates, a filtering operation (or filter operation), namely, "WHERE RR=1" in an outer sub-query of Q1 can be effectively replaced with a qualification operation, namely "Qualify RR=1", in the inner sub-query of Q1. As a result, a nested query Q1 can be optimized to yield the query Q1' that is more efficient to execute because it would require less rows to be created for the derive table "dt". In other words, the filter in the outer query of Q1 (shown in Table 1) can be pushed as a qualify clause in the derived table/view which because the qualify clause ("QUALIFY RR=1") can be represented as the last operator in the derived table DT.

However, unlike the very simple example shown above, optimization of nested queries with windowing and filtering operations can be very complex partly because qualification clauses need not be the last operator and nested queries can be very complex using Join operations.

Thus, techniques for optimization of nested queries with windowing and filtering operations are needed.

As such, it will be appreciated that in accordance with one aspect of the invention, a nested database query can be optimized by effectively representing a filtering function or operation (e.g., SQL filtering operation) of its outer sub-query by a qualification or qualify operation (e.g., SQL qualification operation) associated with at least one windowing function of at least one of its inner sub-queries. It will be appreciated that this representation can yield a modified query that would be equivalent (e.g., semantically equivalent) to the original nested query as its execution can produce the same results when optimization rules provided in accordance with another aspect of the invention are applied.

It will also be appreciated that the determination of whether to optimize a nested query can be made based on optimization rules provided in accordance with another aspect of the invention. The optimization rules can, for example, be based on presence of a sampling (or sample) operation in the inner sub-query, presence and type of various Join operations (e.g., inner or outer join operations) in the nested query, presence of various clauses (e.g., WHERE or ON clauses) which an outer join operation can be predicted upon, and so on.

It will also be appreciated that in a context of a parallel database system, a filter can also be applied on each processing unit or unit of parallelism, reducing the computation and space requirements.

Embodiments of these aspects of the invention are also discussed below with reference to FIGS. 1-8. However, those skilled in the art will readily appreciate that the detailed description given herein with respect to these figures is for explanatory purposes as the invention extends beyond these limited embodiments.

FIG. 1 depicts a database system 100 that includes a Window Functions Optimizer (WFO) 102 in accordance with one embodiment of the invention. As suggested by FIG. 1, the database system 100 may also include a database manager 110 (e.g., Database Management System (DBMS), a Relational Database Management System (RDBMS)) that effectively manages a database 101. As such, the database estimator 102 may, for example, be provided as a part of the database manager 110. More particularly, it will be appreciated that the Window Functions Optimizer (WFO) 102 can be provided as a part of an optimizer 112 in the database manager 110. Of course, as shown in FIG. 1, the Window Functions Optimizer (WFO) 102 can be provided as a separate component. Furthermore, it is not necessary to use a database manager 110 and/or an optimizer 112 because the Window Functions Optimizer (WFO) 102 can operate independently and separately from each and both of these components.

Those skilled in the art will also readily appreciate that the Window Functions Optimizer (WFO) 102 can be implemented at least partly as a computer executable program and/or as a hardware component. For example, the Window Functions Optimizer (WFO) 102 can be provided as executable computer code stored in memory (not shown) and executed by one or more processors (not shown).

In any case, it will be appreciated that the Window Functions Optimizer (WFO) 102 can optimize database queries of the database 102, including a nested database query Q that includes one or more windowing functions and one or more filtering operations. In doing so, the Window Functions Optimizer (WFO) 102 can determine whether to represent one or more filtering operations (e.g., SQL window functions) of the at least one outer sub-query of the nested query Q as one or more corresponding qualification operations (e.g., a SQL qualify clause) associated with the one or more window functions in the at least one inner sub-query of the nested query Q, and effectively represent the one or more filtering operations of the at least one outer sub-query as the one or more corresponding qualification operations associated with the one or more window functions in the at least one inner sub-query when the WFO 102 determines to represent the one or more filtering operations as the one or more corresponding qualification operations.

It should be noted that the WFO 102 can effectively use optimization rules 104 to determine whether to represent one or more filtering operations (e.g., SQL window functions) of the at least one outer sub-query of the nested query Q as one or more corresponding qualification operations (e.g., a SQL qualify clause) associated with the one or more window functions in the at least one inner sub-query of the nested query Q.

As an example, Table 3 below shows transformation of a query Q2 to Q2' in accordance with one embodiment of the invention.

TABLE 3

Q2: SELECT * FROM (SELECT TOP 1 row_number( ) OVER (ORDER BY a1) as RR FROM
t1 ORDER BY b1) dt WHERE RR =1;
Q2': SELECT * FROM (SELECT TOP 1 row_number( ) OVER (ORDER BY a1) as RR FROM
t1 QUALIFY RR = 1 ORDER BY b1) dt;

To further elaborate, FIG. 2A depicts six (6) stages that can occur in order when processing a query. Generally, processing of each one of a number of sub-queries in a nested query could require execution of each one of the six (6) stages shown in FIG. 2A, namely, a first stage (1) projection, a second stage (2) selection that can be done for a single table or tabled joined by a Join operation, a third stage (3) aggregations, a fourth (4) stage window or windowing operations, a fifth stage (5) sampling, and a sixth stage (6) distinct operations. It should be noted that not all of the stages need to done, especially, fifth and sixth stages are not done respectively if there is no sampling or distinct operations. However, generally, all six stages may be performed to execute for each one of the sub-queries of a nested query.

The optimization rules 104 can effectively be used to allow or deny application of the second stage (2), namely, selections of an outer sub-query of a nested query Q to the fourth stage (4), namely, windowing operation of an inner sub-query of the nested query Q. In other words, referring to FIG. 2B, the optimization rules 104 can be used to determine whether a filtering operation $F_x$ of an outer sub-query can be applied to a window operation $W_x$ of an inner sub-query of a nested query shown in depicted in FIG. 2B. As another example, referring to FIG. 2C, the optimization rules 104 can be used to determine whether a filtering operation $F_x$ of an outer sub-query can be applied to one of the windowing operations $W_x$ of two inner sub-queries that are joined with a Join operation.

Referring back to FIG. 2A, one general rule can be stated as not allowing (or denying) application of a filtering operation $F_x$ of an outer sub-query to a window operation $W_x$ of an inner sub-query of a nested query (shown in FIG. 2B) when the inner sub-query has a sampling operation (requiring a fifth stage (5) for one or more sampling operations).

As will be described below, other optimization rules can be used to effectively determine whether to apply a filtering operation $F_x$ of an outer sub-query to one of the windowing operations $W_x$ of two inner sub-queries that are joined with a Join operation. These optimization rules generally depend on the type of Join operation and clauses involved in a nested query. Specifically, if the Join operation is an inner join, then a filtering operation $F_x$ of an outer sub-query can be presented as a qualification operation of a window functions $W_x$ in either one of the inner sub-queries shown in FIG. 2C. However, if the Join operation is an outer join operation, the application of a filtering operation $F_x$ of an outer sub-query can be applied in accordance with the rules summarized in FIG. 2D. Referring to FIG. 2D, in case of a Left Outer Join (LOJ) and a "WHERE" clause, the filtering operation $F_x$ of an outer sub-query can be presented as a qualification operation of a window functions $W_x$ of the left table. On the other hand, in case of a Left Outer Join (LOJ) and an "ON" clause, the filtering operation $F_x$ of an outer sub-query can be presented as a qualification operation of a window functions $W_x$ of the Right table. As shown in FIG. 2D, the rules for Right Outer Joins (ROJ's) can be exactly the opposite of the LOJ's), where in presence of a "Where" clause, the filtering operation $F_x$ of an outer sub-query can be presented as a qualification operation of a window functions $W_x$ of the Right table, and in presence of an "ON" clause, the filtering operation $F_x$ of an outer sub-query can be presented as a qualification operation of a window functions $W_x$ of the Left table.

As examples of queries with Join operations, Tables 4 and 5 below respectively show transformations of queries Q3 and Q4 for an inner join and left outer join in accordance with embodiments of the invention.

TABLE 4

```
Q3: SELECT a1 FROM
       (SELECT a1, row_number( ) OVER (ORDER BY a1) as RR1 FROM t1) dt1
    INNER JOIN
       (SELECT a2, rank( ) OVER (ORDER BY a2) as RR2 FROM t2) dt2
    ON a1=a2 and RR2 =1;
Q3': SELECT a1 FROM
       (SELECT a1, row_number( ) OVER (ORDER BY a1) as RR1 FROM t1) dt1
    INNER JOIN
       (SELECT a2, rank( ) OVER (ORDER BY a2) as RR2 FROM t2 QUALIFY RR2=1)
       dt2
    ON a1=a2;
```

TABLE 5

```
Q4: SELECT a1 FROM
       (SELECT a1, row_number( ) OVER (ORDER BY a1) as RR1
       FROM t1) dt1
    LEFT OUTER JOIN
       (SELECT a2, rank( ) OVER (ORDER BY a2) as RR2 FROM
       t2) dt2
    ON a1=a2 and RR2 =1;
Q4': SELECT al FROM
       (SELECT a1, row_number( ) OVER (ORDER BY a1) as RR1
       FROM t1 ) dt1
    LEFT OUTER JOIN
       (SELECT a2, rank( ) OVER (ORDER BY a2) as RR2 FROM
       t2 QUALIFY
RR2=1) dt2
    ON a1=a2;
```

Figure 3:
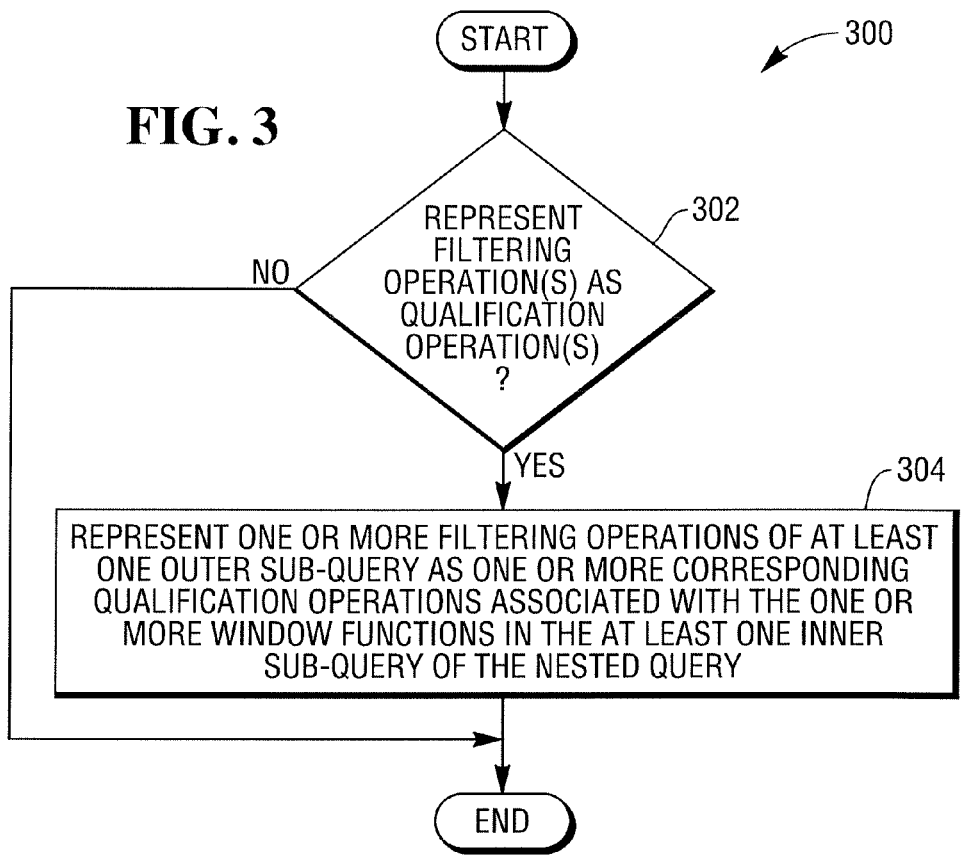
FIG. 3 depicts a method for optimizing a nested query in accordance with one embodiment of the invention.

To elaborate even further, FIG. 3 depicts a method 300 for optimizing a nested query in accordance with one embodiment of the invention. It should be noted that the nested database query includes at least one inner sub-query, at least one outer sub-query, one or more window functions in the at least one inner sub-query, and one or more filtering operations in the at last one outer sub-query. Method 300 can, for example, be used by the Window Functions Optimizer (WFO) 102 shown in FIG. 1.

Referring to FIG. 3, it is determined (302) whether to represent one or more filtering operations (e.g., a SQL filter operation) of at least one outer sub-query of the nested query as one or more corresponding qualification operations (e.g., a SQL qualify clause) associated with the one or more window functions in at least one inner sub-query of the nested query. If it is determined (302) not to do so, method 300 can end. However, if it is determined (302) to do so, one or more filtering operations of the at least one outer sub-query can be effectively represented (304) as the one or more corresponding qualification operations associated with the one or more window functions in the at least one inner sub-query. By way of example, a filtering operation of in an outer sub-query can be combined with a windowing function of an inner sub-query as shown in Table 2 above. Method 300 can end following the representation (304) of the one or more filtering operations of the at least one outer sub-query as the one or more corresponding qualification operations.

Figure 4:
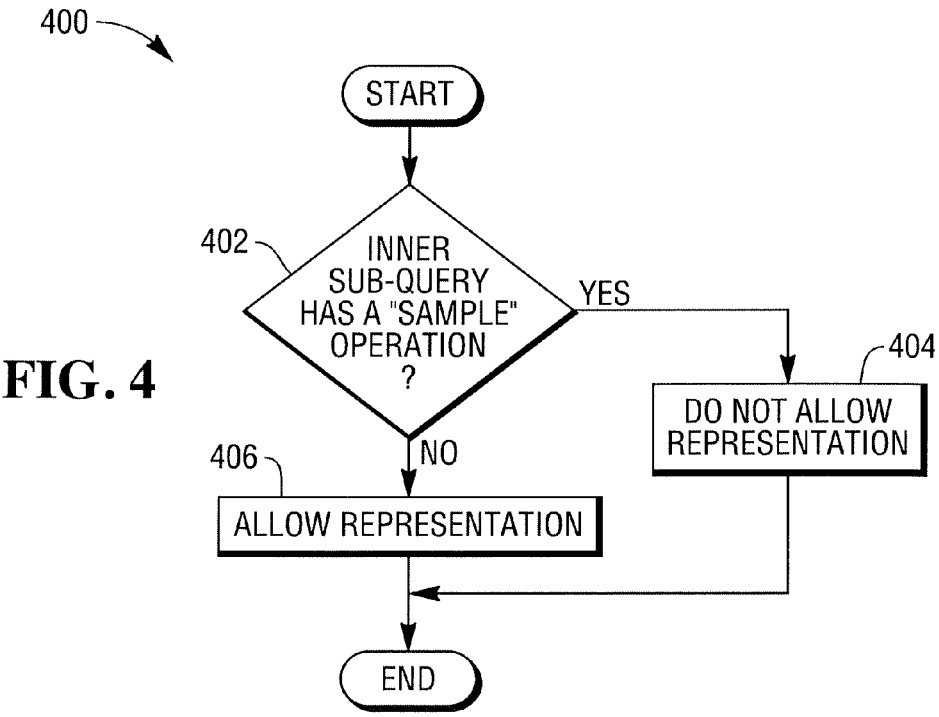
FIG. 4 depicts a method for determining whether a filtering operation of an outer sub-query can be represented as a windowing function of an inner sub-query of a nested query in accordance with one embodiment of the invention.

To elaborate further yet, FIG. 4 depicts a method 400 for determining whether a filtering operation of an outer sub-query can be represented as a windowing function of an inner sub-query of a nested query in accordance with one embodiment of the invention. Method 400 can be representative of an operation that can be performed in determination (302) depicted in FIG. 3. Method 400 can also be representative of applying an optimization rule with respect to presence of a sample operation.

Referring to FIG. 4, it is determined (402) whether an inner sub-query has a sample operation. If it is determined (402) that the inner sub-query has a sample operation, the representation of the filtering operation of the outer sub-query as a windowing function of an inner sub-query of the nested query is denied (404) before the method 400 ends. However, if it is determined (402) that an inner sub-query does not have any sample operations, the representation of the filtering operation of the outer sub-query as a windowing function of the inner sub-query of the nested query is allowed (406) before the method 400 ends.

Figure 5A:
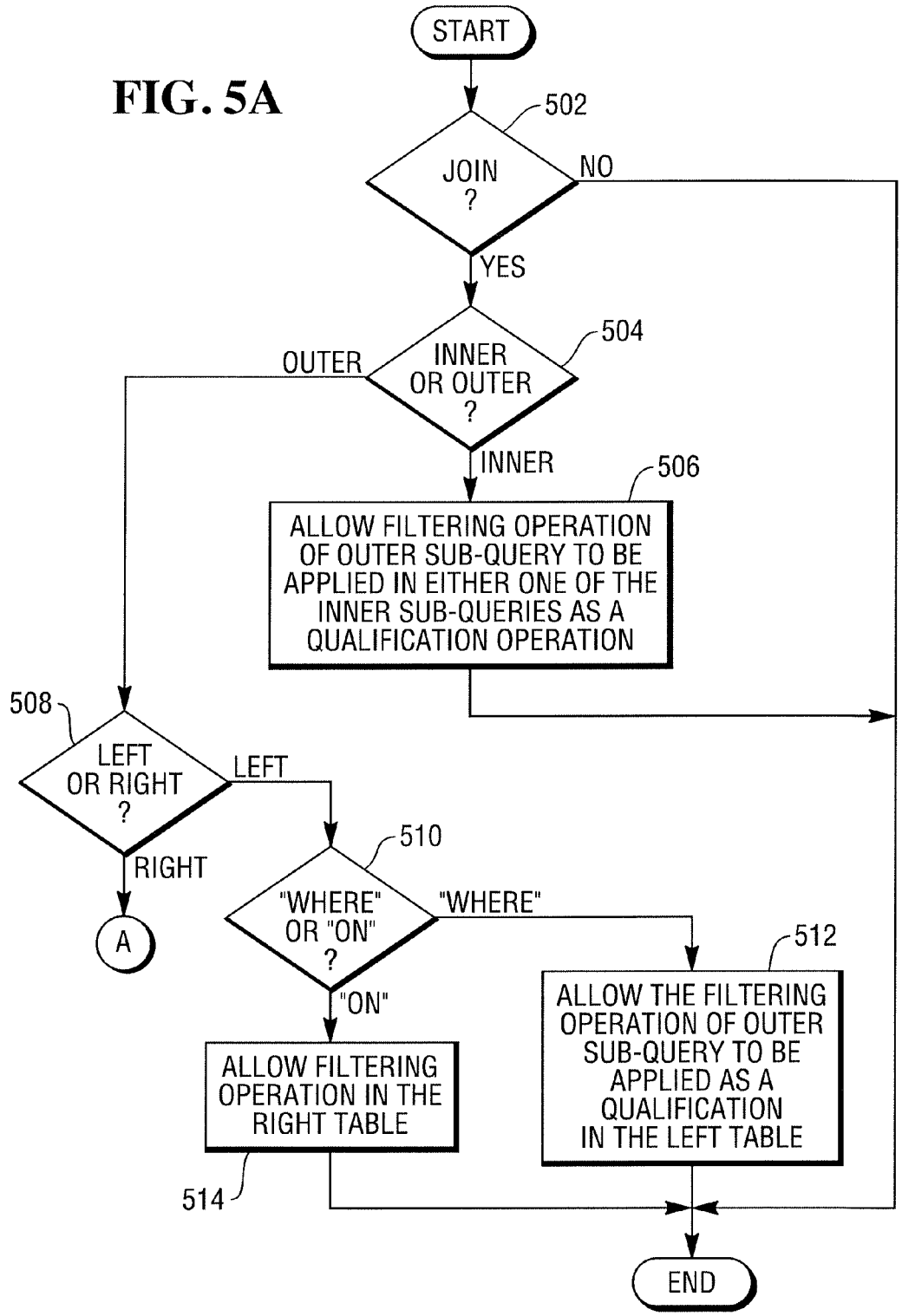
FIGS. 5A and 5B depict a method for determining whether a filtering operation of an outer sub-query can be represented as a windowing function of an inner sub-query of a nested query in accordance with one embodiment of the invention.
Figure 5B:
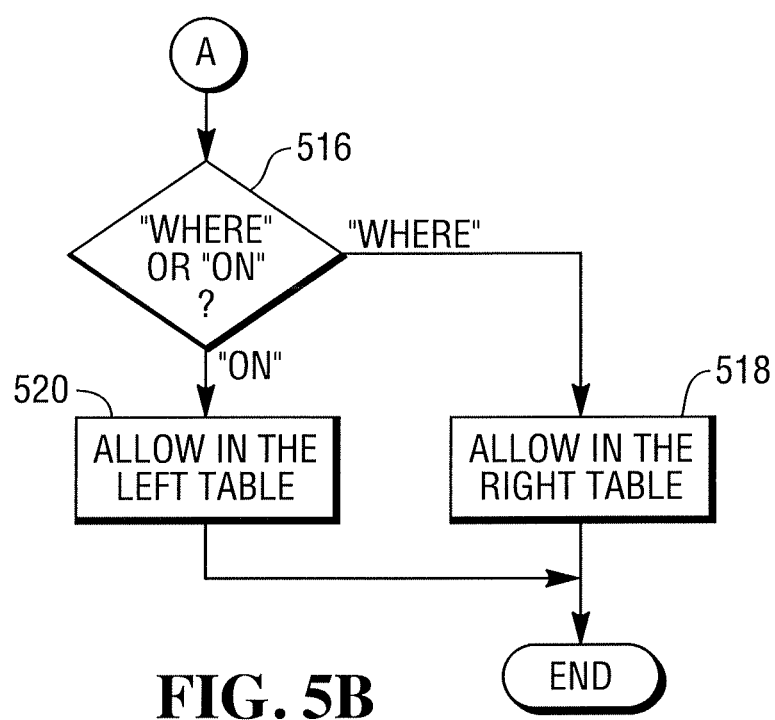

To elaborate further still, FIGS. 5A and 5B depict a method 500 for determining whether a filtering operation of an outer sub-query can be represented as a windowing function of an inner sub-query of a nested query in accordance with one embodiment of the invention. Method 500 can be representative of an operation that can be performed in determination (302) depicted in FIG. 3. Method 500 can also be representative of applying optimization rules with respect to presence of a Join operation.

Referring to FIG. 5A, initially, it is determined (502) whether the nested query includes a join operation the joins at least two inner sub-queries. If it is determined (502) that no such join operation is present, the method 500 can end. However, if it is determined (502) that the nested query includes at least one join operation the joins at least two inner sub-queries, it is determined (504) whether an inner or an outer join is present. If it determined (504) that an inner join operation is joining at least two inner sub-queries, application of one or more filtering operations of an outer sub-query as a qualification operation of one or more windowing operations associated with either one of the left and right tables involved in the inner join operation is allowed (506) before the method 500 ends.

On the other hand, if it determined (504) that an outer join operation is joining at least two inner sub-queries, it determined (508) whether the outer join is a left or a right join operation. Accordingly, if it is determined (508) that the outer join is a left outer join operation, it is also determined (510) whether it is predicated on a "WHERE" clause or predicated on an "ON" clause. In case of a "WHERE" clause, a filtering operation of an outer sub-query of the nested query can be allowed (512) to be applied as a qualification operation associated with a left table of the left outer join before the method 500 ends. In case of an "ON" clause, a filtering operation of an outer sub-query of the nested query can be allowed (514) to be applied as a qualification operation associated with a right table of the left outer join before the method 500 ends.

However, referring now to FIG. 5B, if it is determined (508) that the outer join is a right outer join operation, it is also determined (516) whether it is predicated on a "WHERE" clause or predicated on an "ON" clause. In case of a "WHERE" clause, a filtering operation of an outer sub-query of the nested query can be allowed (518) to be applied as a qualification operation associated with a right table of the right outer join before the method 500 ends. In case of an "ON" clause, a filtering operation of an outer sub-query of the nested query can be allowed (520) to be applied as a qualification operation associated with a left table of the right outer join before the method 500 ends.

Multi-Node, Parallel Database Systems

The techniques of the invention can be useful for large database systems, including multi-node, parallel database systems partly because of the ever increasing need and desire to optimize execution of queries which may be executed in parallel for typically large databases. A multi-node parallel database system can, for example, use a massively parallel processing (MPP) architecture or system to perform various database operations in parallel.

Figure 6:
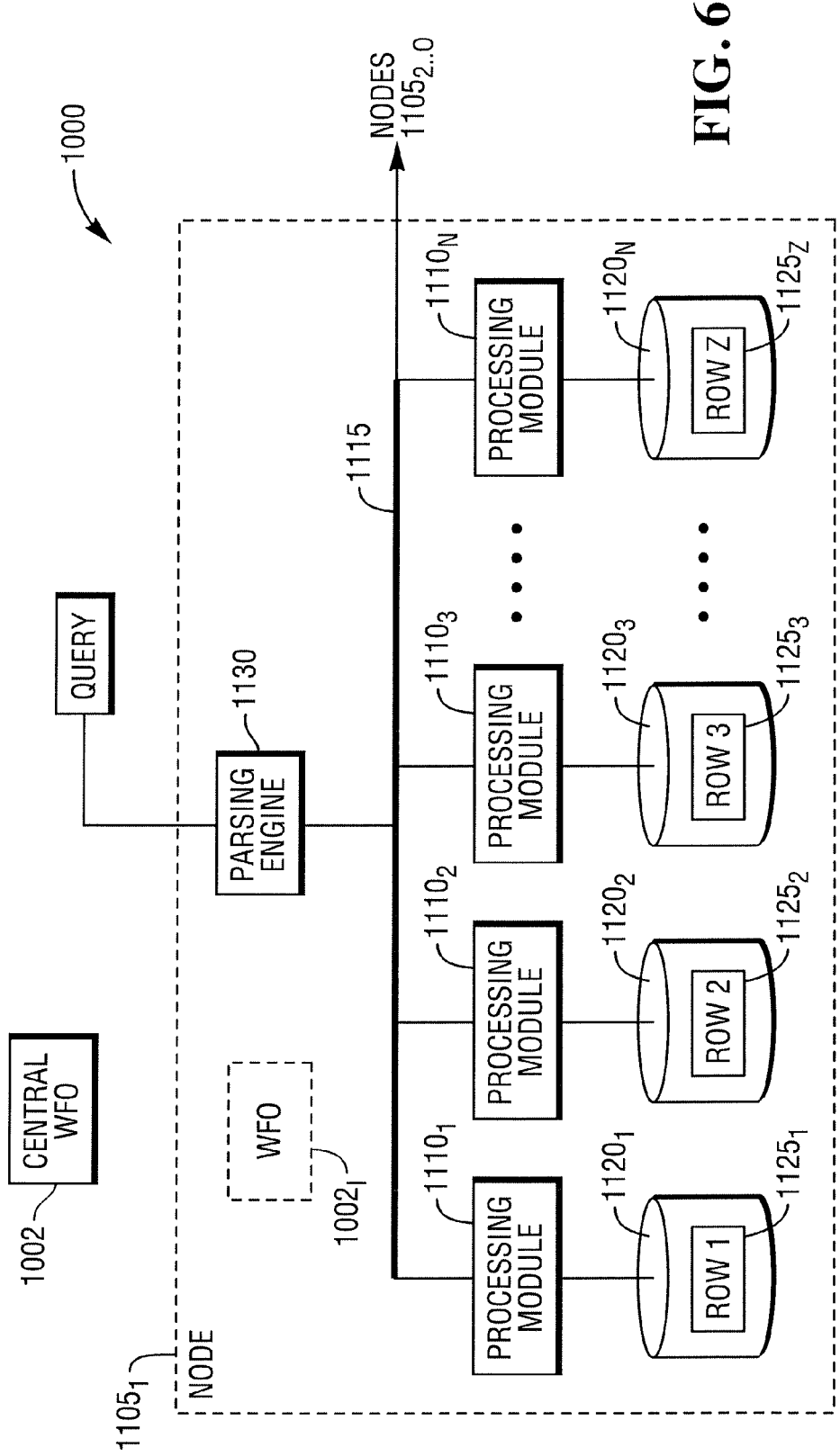
FIG. 6 depicts a database node of a database system or Database Management System (DBMS) in accordance with one embodiment of the invention.

To further elaborate, FIG. 6 depicts a database node $1105_1$ of a database system or Database Management System (DBMS) 1000 in accordance with one embodiment of the invention. The database system 1000 can, for example, be provided as a Teradata Active Data Warehousing System. It should be noted that FIG. 6 depicts an exemplary architecture for one database node $1105_1$ of the DBMS 1000 in accordance with one embodiment of the invention. Referring to FIG. 6, the DBMS node $1105_1$ includes one or more processing modules 1110-N connected by a network 1115, that manage the storage and retrieval of data in data-storage facilities $1120_{1-N}$. Each of the processing modules 1110-N can represent one or more physical processors or virtual processors, with one or more virtual processors (e.g., Access Module Processer (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing modules $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). It should be noted that the DBMS 1000 may include additional database nodes $1105_{2-O}$ in addition to the database node $1105_1$. The additional database nodes $1105_{2-O}$ are connected by extending the network 1115. Data can be stored in one or more tables in the data-storage facilities $1120_{1-N}$. The rows $1125_{1-z}$ of the tables can be stored across multiple data-storage facilities $1120_{1-N}$ to ensure that workload is distributed evenly across the processing modules $1110_{1-N}$. A parsing engine 1130 can organize the storage of data and the distribution of table rows $1125_{1-z}$ among the processing modules $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as SQL.

In one implementation, the rows $1125_{1-z}$ are distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $1120_{1-N}$ and associated processing modules $1110_{1-N}$ by a hash bucket map. The characteristics of the columns chosen for the primary index determine how evenly the rows are distributed.

Referring to FIG. 6, it should be noted that a Window Function Optimizer (WFO) 1002 can be provided. It should be noted that the WFO 1002 can be provided as a separate central entity (or component, or module) severing all of the database nodes 1105 or it can at least partially be implemented in the parsing engine 1130 of the database node 1105$_i$ or another one the nodes 1105 (not shown).

Figure 7:
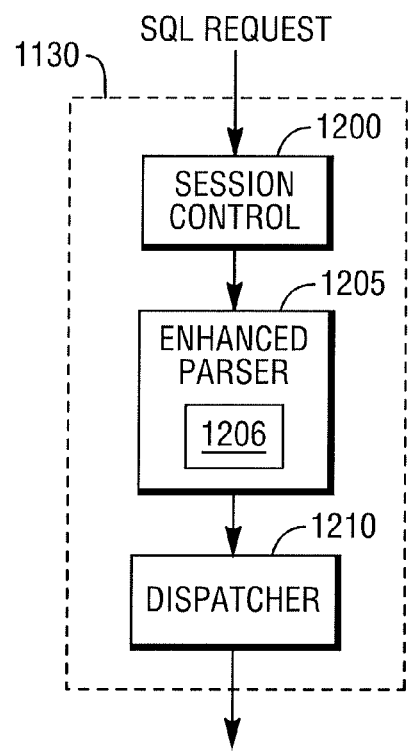
FIG. 7 depicts a parsing engine in accordance with one embodiment of the invention.

In one exemplary system, the parsing engine 1130 is made up of three components: a session control 1200, an enhanced parser 1205, and a dispatcher 1210, as shown in FIG. 7. The enhanced parser 1205 can provide a WFO 1206 in accordance with one embodiment of the invention. The session control 1200 provides the logon and logoff function. It accepts a request for authorization to access the database, verifies it, and then either allows or disallows the access. When the session control 1200 allows a session to begin, a user may submit a SQL request, which is routed to the enhanced parser 1205. The dispatcher 1210 provides an internal status of every session and request running on the system. It does this by using internal messages sent from the AMPs to the dispatcher 1210. The dispatcher 1210 provides an internal status of every session and request running on the system. It should be noted that that an enhanced parser 1205 can effectively provide a WFO 1202 in accordance with one embodiment of the invention.

Figure 8:
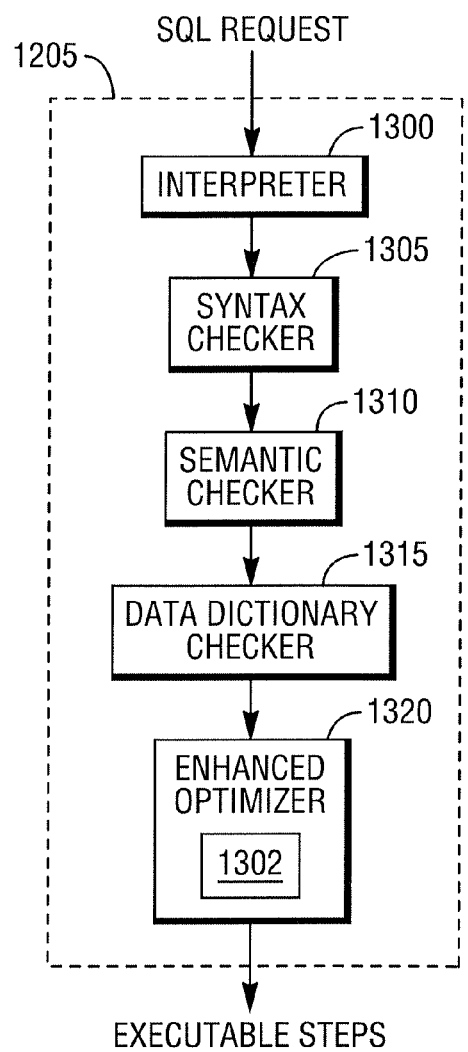
FIG. 8 depicts an optimizer that can provide a Window Function Optimizer (WFO) in accordance with one embodiment of the invention.

As illustrated in FIG. 8, the enhanced parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the enhanced parser 1205 runs an enhanced optimizer (block 1320), which generates the least expensive plan to perform the request. It will be appreciated that an enhanced optimizer (block 1320) can provide a WFO 1302 in accordance with one embodiment of the invention. It should be noted that a filter can also be applied on each AMP or unit of parallelism reducing the computation and space requirements.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of optimizing a nested database query that includes at least one inner sub-query, at least one outer subquery, one or more window functions in the at least one inner sub-query, and one or more filtering operations in the at least one outer sub-query, wherein evaluation of the inner and outer sub-queries requires construction of one or more intermediate tables, and wherein the computer-implemented method comprises:

obtaining the nested database query for processing by a database system;
evaluating the obtained nested database query by at least the following:
(i) determining that the inner sub-query includes a sampling operation, and
(ii) determining that the nested database query includes at least one inner join operation joining at least two inner sub-queries, wherein at least one of the inner sub-queries includes one or more window functions;
determining based on the evaluating whether to represent the one or more filtering operations of the at least one outer sub-query as one or more corresponding qualification operations associated with the one or more window functions in the at least one inner sub-query, (iii) wherein it is determined not to represent the one or more filtering operations as the one or more corresponding qualification operations when it is determined that the inner sub-query includes a sampling operation; and (iv) wherein it is determined to represent at least one filtering operation of an outer sub-query as a qualification operation of one or more window functions in either one of the inner sub-queries when it is determined that the query includes at least one inner join operation joining at least two inner sub-queries;
effectively representing the one or more filtering operations of the at least one outer sub-query as the one or more corresponding qualification operations associated with the one or more window functions in the at least one inner subquery when the determining determines to represent the one or more filtering operations as the one or more corresponding qualification operations;
obtaining a modified database query which is equivalent to the nested database query but is evaluated with intermediate tables that are reduced in size with respect to the one or more intermediate tables that are required to evaluate the database query in its original form and;
evaluating the modified database query with the intermediate tables that are reduced in size with respect to the one or more intermediate tables that are required to evaluate the database query in its original form, in order to process that obtained nested database query.

2. The computer-implemented method of claim 1, wherein the effectively representing comprises combining the one or more filtering operations with one or more existing qualification operations associated with the one or more window operations of the inner sub-query.

3. The computer-implemented method of claim 1, wherein the computer implemented method further comprises:

determining whether the query includes at least one left outer join operation predicated on a where clause and joining at least two inner sub-queries;
representing the filtering operation of the outer sub-query as a qualification operation associated with a left table involved in the left outer join operation when the determining determines that the query includes at least one left outer join operation predicated on a where clause and joining at least two inner sub-queries.

4. The computer-implemented method of claim 1, wherein the computer implemented method further comprises:

determining whether the query includes at least one left outer join operation predicated on an on clause and joining at least two inner sub-queries;
representing the filtering operation of the outer sub-query as a qualification associated with a right table involved in the left outer join operation when the determining determines that the query includes at least one left outer join operation predicated on an on clause and joining at least two inner sub-queries.

5. The computer-implemented method of claim 1, wherein the computer implemented method further comprises:
determining whether the query includes at least one right outer join operation predicated on a where clause and joining at least two inner sub-queries;
representing the filtering operation of the outer sub-query as a qualification operation associated with a right table involved in the right outer join operation when the determining determines that the query includes at least one right outer join operation predicated on a where clause and joining at least two inner sub-queries.

6. The computer-implemented method of claim 1, wherein the computer implemented method further comprises:
determining whether the query includes at least one right outer join operation predicated on an on clause and joining at least two inner sub-queries;
representing the filtering operation of the outer sub-query as a qualification operation associated with a left table involved in the right outer join operation when the determining determines that the query includes at least one right outer join operation predicated on an on clause and joining at least two inner sub-queries.

7. A database system that includes one or more or processors comprising optimizing a nested database query that includes at least one inner sub-query, at least one outer subquery, one or more window functions in the at least one inner sub-query, and one or more filtering operations in the at least one outer sub-query, wherein evaluation of the inner and outer sub-queries requires construction of one or more intermediate tables, and wherein the one or more processors is operable to:
obtain the nested database query for processing by a database system;
evaluate the obtained nested database query by at least the following:
(i) determine that the inner sub-query includes a sampling operation, and
(ii) determine that the nested database query includes at least one inner join operation joining at least two inner sub-queries, wherein at least one of the inner sub-queries includes one or more window functions;
determine based on the evaluating whether to represent the one or more filtering operations of the at least one outer sub-query as one or more corresponding qualification operations associated with the one or more window functions in the at least one inner sub-query,
(iii) wherein it is determined not to represent the one or more filtering operations as the one or more corresponding qualification operations when it is determined that the inner sub-query includes a sampling operation; and (iv) wherein it is determined to represent at least one filtering operation of an outer sub-query as a qualification operation of one or more window functions in either one of the inner sub-queries when it is determined that the query includes at least one inner join operation joining at least two inner sub-queries;
effectively represent the one or more filtering operations of the at least one outer sub-query as the one or more corresponding qualification operations associated with the one or more window functions in the at least one inner subquery when the determining determines to represent the one or more filtering operations as the one or more corresponding qualification operations;
obtain a modified database query which is equivalent to the nested database query but is evaluated with intermediate tables that are reduced in size with respect to the one or more intermediate tables that are required to evaluate the database query in its original form and;
evaluate the modified database query with the intermediate tables that are reduced in size with respect to the one or more intermediate tables that are required to evaluate the database query in its original form, in order to process that obtained nested database query.

8. The database system of claim 7, wherein the effectively representing comprises combining the one or more filtering operations with one or more existing qualification operations associated with the one or more window operations of the inner sub-query.

9. The database system of claim 7,
wherein the determining of whether to represent the one or more filtering operations as one or more corresponding qualification operations comprises:
determining whether the inner sub-query includes a sampling operation; and
wherein the one or more processors are further operable to:
determine not to represent the one or more filtering operations as the one or more corresponding qualification operations when the determining determines that the inner sub-query includes a sampling operation.

10. The database system of claim 7, wherein the one or more processor are further operable to:
determine whether the query includes at least one left outer join operation predicated on a where clause and joining at least two inner sub-queries;
represent the filtering operation of the outer sub-query as a qualification operation associated with a left table involved in the left outer join operation when the determining determines that the query includes at least one left outer join operation predicated on a where clause and joining at least two inner sub-queries.

11. The database system of claim 7, wherein the one or more processor are further operable to:
determine whether the query includes at least one left outer join operation predicated on an on clause and joining at least two inner sub-queries;
represent the filtering operation of the outer sub-query as a qualification associated with a right table involved in the left outer join operation when the determining determines that the query includes at least one left outer join operation predicated on an on clause and joining at least two inner sub-queries.

12. The database system of claim 7, wherein the one or more processor are further operable to:
determine whether the query includes at least one right outer join operation predicated on a where clause and joining at least two inner sub-queries;
represent the filtering operation of the outer sub-query as a qualification operation associated with a right table involved in the right outer join operation when the determining determines that the query includes at least one right outer join operation predicated on a where clause and joining at least two inner sub-queries.

13. The database system of claim 7, wherein the one or more processor are further operable to:

determine whether the query includes at least one right outer join operation predicated on an on clause and joining at least two inner sub-queries;

represent the filtering operation of the outer sub-query as a qualification operation associated with a left table involved in the right outer join operation when the determining determines that the query includes at least one right outer join operation predicated on an on clause and joining at least two inner sub-queries.

14. A non-transient computer readable storage medium storing at least executable code for optimizing a nested database query that includes at least one inner sub-query, at least one outer sub-query, one or more window functions in the at least one inner sub-query, and one or more filtering operations in the at last one outer sub-query, wherein evaluation of the inner and outer sub-queries requires construction of one or more intermediate tables, wherein when the code is executed by a computer system the executable code:

obtains the nested database query for processing by a database system;

evaluates the obtained nested database query by at least the following:
  (i) determining that the inner sub-query includes a sampling operation, and
  (ii) determining that the nested database query includes at least one inner join operation joining at least two inner sub-queries, wherein at least one of the inner sub-queries includes one or more window functions;

determining based on the evaluating whether to represent the one or more filtering operations of the at least one outer sub-query as one or more corresponding qualification operations associated with the one or more window functions in the at least one inner sub-query, (iii) wherein it is determined not to represent the one or more filtering operations as the one or more corresponding qualification operations when it is determined that the inner sub-query includes a sampling operation; and (iv) wherein it is determined to represent at least one filtering operation of an outer sub-query as a qualification operation of one or more window functions in either one of the inner sub-queries when it is determined that the query includes at least one inner join operation joining at least two inner sub-queries;

effectively represents the one or more filtering operations of the at least one outer sub-query as the one or more corresponding qualification operations associated with the one or more window functions in the at least one inner subquery when the determining determines to represent the one or more filtering operations as the one or more corresponding qualification operations;

obtains a modified database query which is equivalent to the nested database query but is evaluated with intermediate tables that are reduced in size with respect to the one or more intermediate tables that are required to evaluate the database query in its original form and;

evaluates the modified database query with the intermediate tables that are reduced in size with respect to the one or more intermediate tables that are required to evaluate the database query in its original form, in order to process that obtained nested database query.

15. The non-transient computer readable storage medium of claim 14, wherein the effectively representation of the one or more filtering operations comprises combining the one or more filtering operations with one or more existing qualification operations associated with the one or more window operations of the inner sub-query.

* * * * *